May 22, 1956     T. J. R. BRIGHT     2,746,103

DRAUGHT EXCLUDING STRIPS, BEADINGS, MOULDINGS, AND THE LIKE

Filed April 3, 1952     3 Sheets-Sheet 1

INVENTOR
Thomas John Robert Bright
BY
Stevens, Davis, Miller & Mosher
His ATTORNEYS

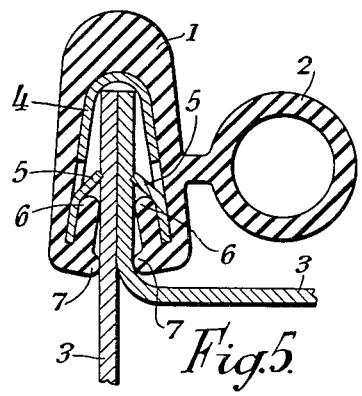
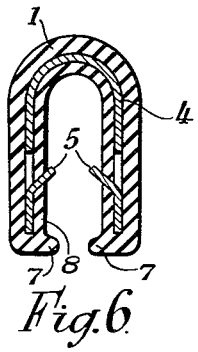
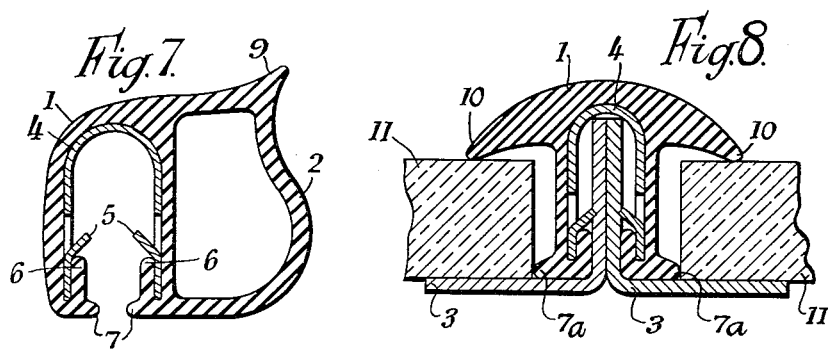
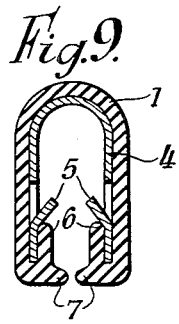
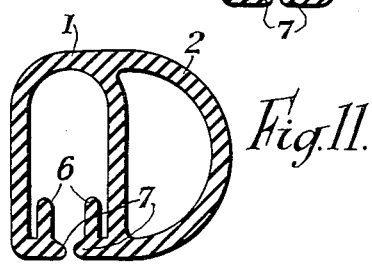

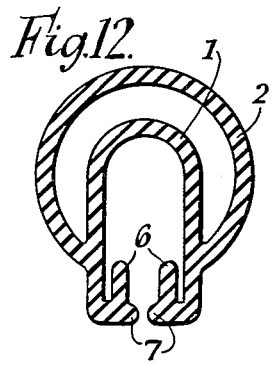
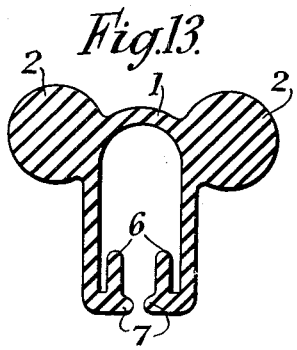
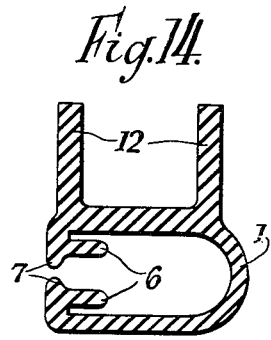
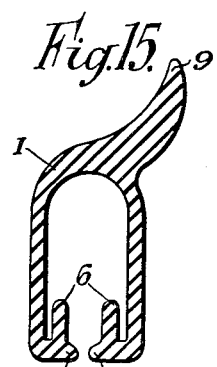
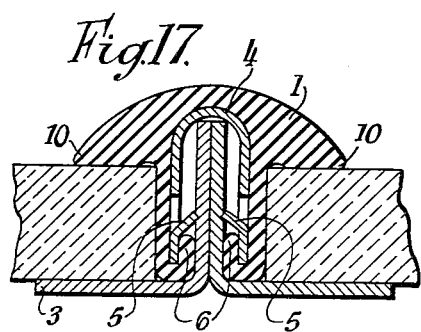
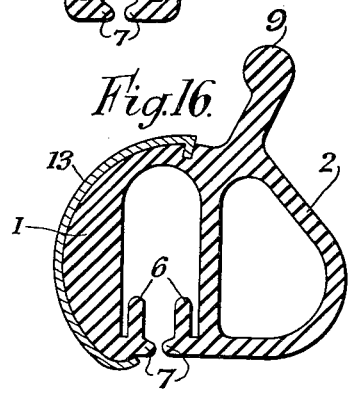
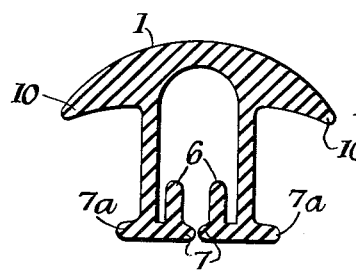

United States Patent Office 2,746,103
Patented May 22, 1956

2,746,103

DRAUGHT EXCLUDING STRIPS, BEADINGS, MOULDINGS, AND THE LIKE

Thomas John Robert Bright, Blackdown, near Leamington Spa, England

Application April 3, 1952, Serial No. 280,351

2 Claims. (Cl. 20—69)

This invention relates to draught excluding or sealing strips, beadings, mouldings and the like, such components being hereinafter referred to as strips and being composed of a soft but resilient material such as, for example, rubber. Such strips which form the subject of the present invention are generally mounted in position on a supporting flange or equivalent part and are employed where it is desired to exclude draughts and generally provide a good sealing between two components or in certain cases they take the form of a moulding or beading which whilst having an ornamental appearance will also act as a buffer or cushion.

The invention is particularly concerned with the production and application of such strips to the doors of motor vehicles for draught excluding or sealing purposes in which case the supporting flange will form a part of the vehicle body or door, the strip being mounted on the flange in a position in which the strip will be sandwiched between the flange and door or in the case of the flange forming part of the door, between the flange and a part of the vehicle body, the strip being compressed under the closing action of the door to provide a good seal. It will be appreciated that from the manufacturing point of view it is very desirable that such strips shall be capable of being quickly secured in position upon their supporting flanges and that once in position there shall be no risk of accidental detachment of the strip especially when the vehicle is in use.

Examples of such strips are disclosed in my United States Patents Nos. 2,554,452 and 2,664,602.

A strip in accordance with the present invention is composed of rubber or other soft but resilient material and internally is of substantially inverted U shape in cross section the strip including spaced depending limbs the lower edges of which are turned inwardly and upwardly to embrace the lower edges of a substantially inverted U shaped clip extending throughout the length of the strip or a series of spaced tags of substantially inverted U shape adapted to embrace a supporting flange on which the strip is to be mounted.

The upwardly turned edges of the strip may be shaped to make frictional engagement with the flange or may be arranged to override lateral projections on said flange or a series of spring tags mounted thereon so that there is a positive interlocking connection between the parts.

Alternatively the clip or the tags carrying the strip may be formed with tangs which make frictional gripping engagement with the flange. The tags are preferably formed from a resilient metal, such as spring steel, the tangs being pressed out of the metal so that they are directed inwardly and upwardly, this arrangement providing a lead to facilitate their application to the flange, the tangs biting into the metal of the flange as a result of the natural resiliency of the metal from which the tags are formed and effectively resisting their removal.

The tags may be quite separate from the strip as independent units which can be inserted into the strip at suitable points prior to the strip's application to the flange, or the tags may be placed in position on the flange and the strip then applied thereto in which case the lower edges of the strip which is also of inverted "U" shape may be turned upwardly to embrace the lower edges of the tags or the strip may be actually moulded or extruded around the tags during manufacture in which case the tags will actually be embedded in the strip.

In order that the invention may be clearly understood and readily carried into effect the invention is hereinafter described with reference to the accompanying drawings in which:

Figure 5 is a section drawn to an enlarged scale showing the application of one form of strip and its associated tag to a supporting flange:

Figures 6 and 7 illustrate two alternative forms of strip:

Figure 8 illustrates the idea as applied to a moulding for use in connection with a greenhouse or other structure:

Figure 9 illustrates a further alternative construction:

Figures 10 to 16 illustrate alternative cross-sectional forms of strip which may be used in carrying out the invention:

Figure 17 is a sectional view illustrating a moulding somewhat similar to that illustrated in Figure 8:

Figure 18 illustrates the moulding used in the construction shown in Figure 17, but incorporating a minor modification.

Figure 1:
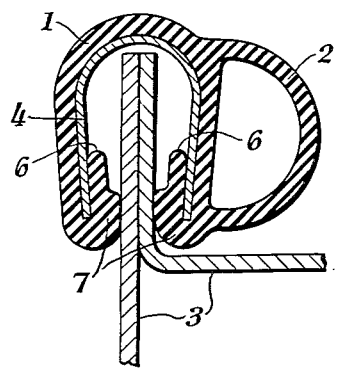
Figures 1 and 2 illustrate one form of strip in accordance with the invention the figures showing two alternative ways of holding the strip in position on a supporting flange.
Figure 2:
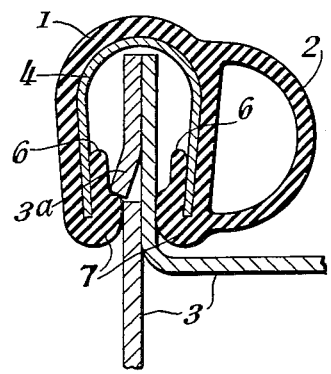
Figure 3:
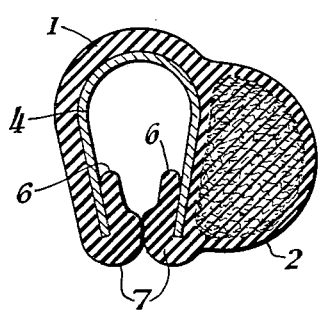
Figure 3 shows the flange removed.
Figure 4:
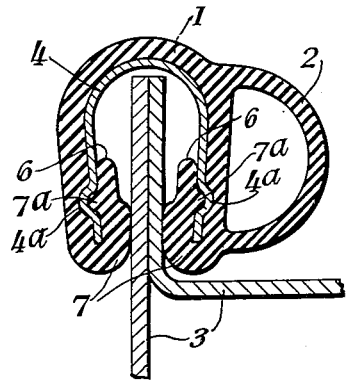
Figure 4 is a section of an alternative form of strip.

Referring in the first case to Figures 1 to 3 of the accompanying drawings the strip 1 is of substantially inverted U shape and has an integrally formed effective portion 2 of substantially D section which in the case of its application to a motor vehicle is intended to be compressed between the door and the supporting flange indicated generally by reference numeral 3. In Figure 3 this effective portion instead of being of the closed tubular form shown in Figures 1, 2 and 4 is formed of sponge rubber or other comparatively soft, but resilient material. As a further alternative the effective portion may be in the form of a split tube or may take the form of a rubber lip which is deflected under the closing action of the door into a position in which it engages the co-operating part and provides a good seal. The strip 1 is mounted in position on the supporting flange by means of a metal or equivalent component of substantially inverted U shape and indicated by reference numeral 4 the component being either in the form of a clip extending throughout the length of the strip or in the form of a series of tags which are suitably spaced throughout the length of the strip. In the case of a continuous clip the latter is preferably formed with staggered slits which project inwardly from opposite edges of the clip and over the greater part of its width. In this way the clip including the strip can be bent around curves of quite small radius.

It will be seen that the edges of the strip are turned inwardly and upwardly to embrace the edges of the clip or tags, the strip being thereby maintained in position on the clip or tags. These edges are indicated by reference numeral 6 and each include an integral inwardly directed bead 7 which fulfills the dual purpose of frictionally engaging the flange and ensuring a good seal against the ingress of moisture. In Figure 1 these beads 7 merely frictionally engage the flange, but in Figure 2 one of the beads overrides a lateral projection 3a on the flange to provide what might be termed a positive interlock. The inherent resiliency of the clip or tags cause the beads to grip the flange the gripping effect being accentuated by forming the clip or tags of the tapering form more clearly shown in Figure 3.

In Figure 4 the limbs of the clip or tags are formed with longitudinal recesses 4a and the upwardly turned edges 6 of the strip are formed with outwardly directed bead-like parts 7a which interengage with the recesses 4a and offer increased resistance to displacement of the strip off its associated clip and the supporting flange, particularly when the strip is applied to a flange which itself is formed with a lateral projection or carries a series of tags which fulfill the same purpose in providing projections over which the inwardly directed beads can pass and thus produce a positive interlock. The curved formation of the beads 7 at their lower edges provide a lead to facilitate forcing the strip into position on the flange.

In Figure 5 the strip 1 is of substantially inverted U shape, the strip carrying an effective portion 2 which in the case of its application to a motor vehicle is intended to be compressed between the door and the supporting flange indicated generally by reference numeral 3. The strip 1 is mounted in position on the supporting flange by means of a series of substantially inverted U-shaped tags 4 each of which is formed with at least two pressed out tangs 5 which are directed inwardly and upwardly so that they provide a lead to facilitate the placing of the tag in position on the flange, but when in position thereon bite into the metal comprising the flange and effectively prevent accidental removal of the tag from the flange, the tag being preferably composed of a resilient metal, such as spring steel, which will ensure the tangs making good frictional engagement with the flange.

The strip 1 is formed at its lower edges with two upstanding flange portions 6 which embrace the lower edges of the tag and effectively secure the two components together. Furthermore, with the object of ensuring a good seal the lower edges of the strip are formed with inwardly directed beads 7 which engage the opposite surfaces of the flange and prevent entry of moisture into the interior of the strip.

In this construction and in fact in all of the constructions hereinafter described, it is preferred to employ a series of tags appropriately spaced apart throughout the length of the strip, but it is within the scope of the invention to employ a single tag in the form of a continuous length, that is to say, of a length equal to the length of the strip with which it is to be associated.

The tag if in the form of a continuous length extending throughout the length of the strip may be formed with slits extending inwardly from its opposite edges, but staggered, for example, as is shown in the drawings of my earlier Patent No. 2,554,452 with the object of enabling the strip and its associated tag to be bent around small radius curves.

In the modified arrangement illustrated in Figure 6, the tag or tags 4 are actually incorporated into the strip, the latter being moulded or extruded around the tag or tags during the manufacturing process. In this construction the inwardly directed tangs 5 pass through the inner surface 8 of the strip into engagement with the flange which is not shown. As in the preceding case the lower edges of the strip are formed with inwardly directed bead-like moisture sealing parts 7 adapted to engage the two faces of the flange with which the strip is associated. The strip as is illustrated in Figure 6 may conveniently be used as a moulding or beading where it is not called upon to be sandwiched between a door and an associated part.

In the case of Figure 7, the general construction is similar to that shown in Figure 5, but in this case the strip 1 has an integrally formed effective portion 2 of somewhat different shape from that shown in Figure 1, the effective portion 2 incorporating a bead-like projection 9 which like the bead-like parts 7 may be used for the purpose of improving the sealing qualities of the strip.

Referring now to Figure 8 the strip in this case is intended to fulfill the function of a sealing strip and moulding and is shown applied to a greenhouse or other structure where it is desired to maintain two sheets of glass or other material in position upon a supporting flange or flanges and to exclude rain or other moisture from the interior of the structure. The strip in this case is formed with two oppositely directed flanges 10 which make contact with the glass panes or the like 11. The general form of the strip is otherwise somewhat similar to that illustrated in Figure 5, but in this case the strip at its lower edges is formed with two outwardly directed bead-like parts 7a which assist in providing a good seal between the glass and the flanges 3 with which the strip is associated.

Figure 9 illustrates a construction somewhat similar to Figure 1, but in this case the effective portion 2 is not included, the strip like the strip illustrated in Figure 6 being intended more particularly for use as a moulding or bead.

Figures 10 to 16 illustrate various alternative cross-sectional shapes of sealing strips or mouldings. Similar reference numerals are employed in these figures to denote the parts which have been hereinbefore referred to, but in the case of Figure 14 it will be seen that the moulding includes two upstanding flanges 12 which may be used to improve the sealing effect or to lie on opposite sides of a glass pane or other component which is to be mounted in position on a structure. In the case of Figure 16 a covering 13 is shown applied to the strip, the cover being of any suitable ornamental fabric or other material and intended to improve the appearance of the strip on the interior of a vehicle with which the strip is associated.

In the case of Figure 17 a somewhat similar form of strip is illustrated to that shown in Figure 8 and consequently similar reference numerals are used to indicate its component parts.

Figure 18 shows the strip which is included in Figure 17 removed from the tag or tags and it will be seen that the strip is actually distorted slightly when it is pressed down in position upon its associated flange, thus ensuring an efficient seal between the flanges 10 and the upper surface of the two glass panes or other components which it is desired to seal against the ingress of moisture.

In Figure 18 the lower edges of the sealing strip are formed with the outwardly directed bead-like parts 7a illustrated in Figure 8 which bead-like parts are omitted in Figure 17 and are formed with inwardly directed bead-like parts 7 similar to those already described in connection with the greater number of constructional forms hereinbefore described.

In all the constructional forms with the exception of Figure 16 a covering material has been omitted, but it will be appreciated that this covering material, particularly in the case of the application of the sealing strip to a motor vehicle is desirable from the point of view of improving the appearance of the strip from an aesthetic point of view, that is to say, the part of the strip which is observable from the interior of the vehicle when the doors are closed. This covering material may take the form of a textile fabric which is adhesively or otherwise secured in position on the strip or applied thereto in the process of moulding or extrusion of the strip from the rubber, plastic or other material of which it is composed and may have a pile or other surface which in addition to giving it an ornamental appearance will also improve the sealing qualities of the strip. Alternatively, the covering may be applied to the strip by an industrial process as, for example, by blowing on flock or other suitable material.

In all the constructions described and shown which incorporate an effective portion, this effective portion may be of tubular or other form or may be composed of sponge rubber or other resilient material which will ensure a good seal between the door and its associated part when the sealing strip is in use.

I claim:

1. A draught excluding arrangement that comprises a plurality of U-section clips each having tangs extending toward one another from opposite shanks of the clip, each tang being located between the free end of the respective shank and the U-shaped portion of the clip, an elongated strip of resilient rubbery material, said strip having an internal contour complementary to the external contour of said clips, said clips being located in individually spaced relation within said strip with their outer surfaces enveloped thereby, and integral flange portions extending lengthwise of the strip and inwardly and upwardly from its opposite edges in embracing relation to the free edges of said clip and engaging the inner surface of the clip shanks between their free ends and the tangs to embrace therebetween a supporting flange.

2. A device as claimed in claim 1 further including a bead on the inwardly facing surface of each said flange portion of said strip to frictionally engage said supporting flange.

References Cited in the file of this patent

UNITED STATES PATENTS

| 2,554,452 | Bright | May 22, 1951 |
| 2,620,524 | Bright | Dec. 9, 1952 |
| 2,636,228 | Morton | Apr. 28, 1953 |
| 2,699,581 | Schlegel | Jan. 18, 1955 |
| 2,704,867 | Dalziel et al. | Mar. 29, 1955 |

FOREIGN PATENTS

| 631,890 | Great Britain | Nov. 11, 1949 |
| 983,883 | France | Feb. 14, 1951 |